United States Patent Office 3,506,460
Patented Apr. 14, 1970

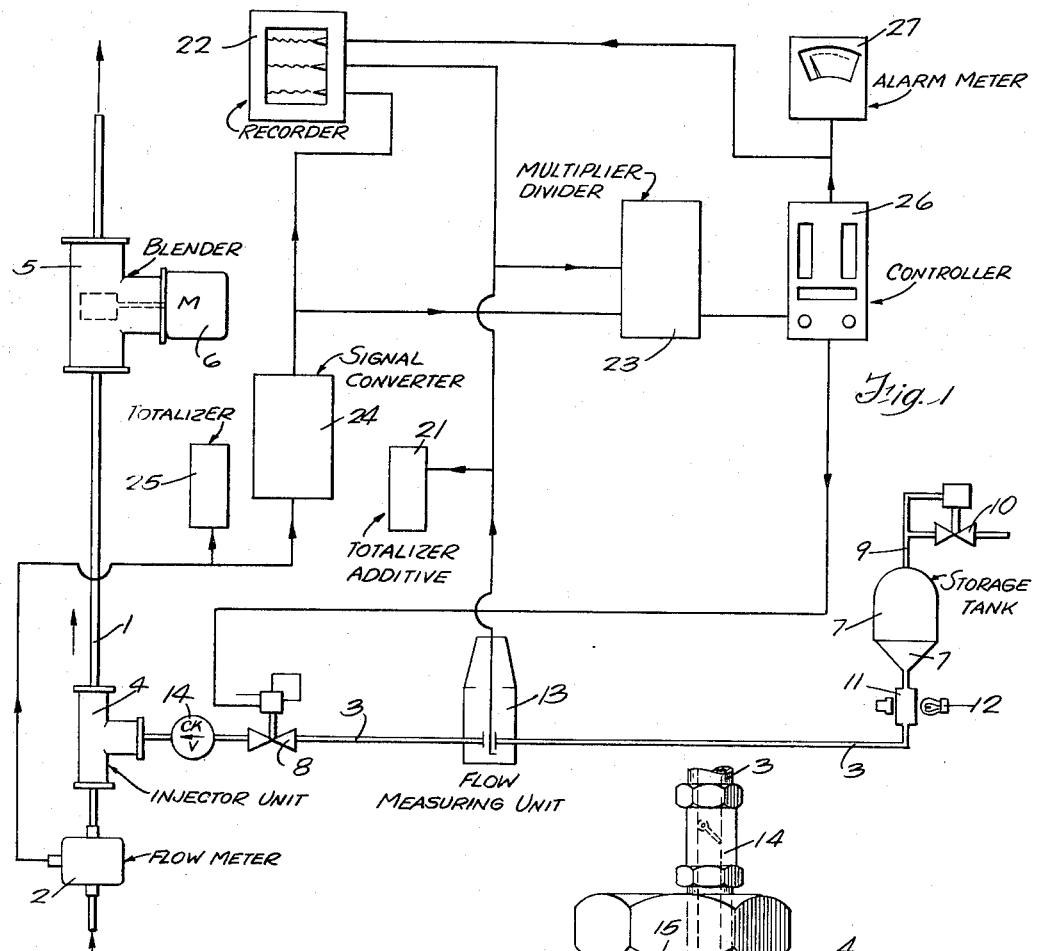
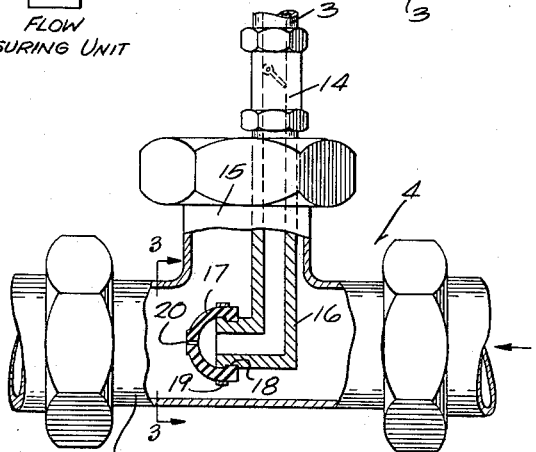
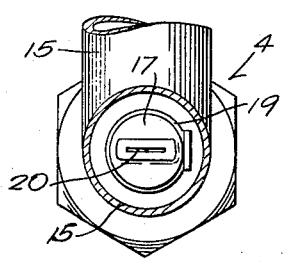

3,506,460
CONTROL SYSTEM FOR COLD STERILIZATION PROCESS
Peter D. Bayne, Shorewood, Wis., assignor to Jos. Schlitz Brewing Co., Milwaukee, Wis., a corporation of Wisconsin
Filed Feb. 20, 1968, Ser. No. 706,898
Int. Cl. A23l 3/34
U.S. Cl. 99—211                                  8 Claims

ABSTRACT OF THE DISCLOSURE

The invention relates to a continuous process for blending small amounts of a relatively insoluble additive into a liquid flow stream, and particularly to a process of blending a sterilizing agent into the flow stream of a perishable material prior to packaging the material. The sterilizing agent is maintained at a pressure greater than the pressure of the perishable material and is introduced into the flow stream in the form of finely divided mist or droplets which are subsequently blended into the perishable material by an in-line agitator or mixer.

The addition of the sterilizing agent to the perishable material is controlled by a valve mechanism in the flow line of the sterilizing agent. A control unit compares the actual proportional flow rate of the sterilizing agent to perishable material with the present proportional flow rate and generates an error or feedback signal in proportion to the difference between the actual and preset values. The error signal is fed to the valve mechanism to accordingly adjust the flow rate of the sterilizing agent and provide the desired final concentration of the sterilizing agent in the flow stream of the perishable material.

Perishable food materials such as fruit juices, beer, soft drinks and the like are normally sterilized by heat treatment after packaging. The heat sterilization consists of heating the packaged material to a temperature in the range of about 140 to 180° F. to destroy any organisms which might be present in the material. Heat sterilization requires a substantial investment in capital equipment, for it necessitates a relatively large heating zone, heating equipment and a conveying mechanism to automatically convey the bottles or cans through the heating zone.

Recently there has been increased activity in the use of liquid sterilizing agents as a substitute for the traditional heat sterilization of perishable materials. Certain materials such as diethyl pyrocarbonate or mixed anhydrides are not only effective sterilizing agents but are capable of breaking down or decomposing into products which are compatible with the perishable material and thus will not adversely effect the flavor or odor of the material.

While diethyl pyrocarbonate and other mixed anhydrides are effective sterilizing agents, they are sparingly soluble in water and thus it is difficult to adequately dissolve the sterilizing agents in the beverage or perishable material at the flow rates used for commercial production.

The present invention is directed to a continuous process of blending small amounts of a sparingly soluble sterilizing agent with the flow stream of a liquid perishable material prior to packaging the material. The sterilizing agent is maintained at a pressure slightly greater than the pressure of the beverage or perishable material and is introduced into the flow stream of the beverage by an injector unit. Subsequently the mixture is flowed through an in-line blender where the mixture is agitated to fully dissolve the sterilizing agent in the material.

The addition of the sterilizing agent to the perishable material is controlled by a valve in the flow line of the sterilizing agent and the valve is controlled by a controller unit which compares the actual, proportional flow rate or concentration of sterilizing agent to perishable material with a preset porportional flow rate or concentration and generates an error or feedback signal in proportion to the difference between the actual and preset values. This error signal is then fed back to the valve mechanism and acts to adjust the flow rate of the sterilizing agent to provide the desired final concentration of the sterilizing agent in the perishable material.

As a safety feature, an alarm system is employed to provide a signal when the contration of the sterilizing agent in the material falls outside of preset minimum limits, and a further provision is incorporated to immediately shut off the flow of both the perishable material and the sterilizing agent if the concentration of the sterilizing agent falls outside of maximum preset limits.

The present invention provides an inexpensive yet effective method of adding small amounts of a relatively insoluble material to the flow stream of a perishable material with the addition being accurately and automatically controlled within precise limits of concentration.

The use of the liquid sterilizing agent eliminates the costly heat sterilization equipment normally employed to sterilize perishable materials, such as malt beverages, soft drinks, wine, fruit juices and the like. As the sterilizing agent is merely added to the flow stream of the material as it flows to the filling machine, no additional time is required for sterilization, as opposed to the conventional heat sterilization process which requires a substantial period during the overall bottling process for sterilization.

Other objects and advantages will appear in the course of the following description.

The drawings illustrate the best mode presently contemplated of carrying out the invention.

In the drawings:

FIG. 1 is a schematic flow diagram of the process of the invention;

FIG. 2 is a vertical section of the additive injection unit; and

FIG. 3 is a view taken along line 3—3 of FIG. 2.

Referring to FIG. 1, a perishable liquid, such as fruit juice, beer, soft drinks, wine, or the like, is conveyed through a line 1 and a magnetic flow meter 2 is located in line 1 and measures the rate of flow of the liquid passing through the line and generates an output signal in proportion to the flow rate. Beverages such as beer and wine are relatively clear liquids, while fruit juices and some soft drinks may contain particulate material.

A liquid sterilizing agent, such as diethyl pyrocarbonate, or mixed anhydrides is introduced into the perishable material through a line 3 which is connected through an injection unit 4 to line 1. Located downstream of the injection unit 4 is a mechanical blender 4 which is driven by motor 6. The sterilizing agent is added to the beverage in the injection unit 4 and thereafter the blender, by mechanical action, serves to fully dissolve the sterilizing agent in the perishable material.

The sterilizing agent is contained within a storage tank 7 and line 3 is connected to the lower end of the tank. The flow of the sterilizing agent through the line 4 is controlled by a pneumatically-operated valve 8 to automatically adjust the flow of the sterilizing agent in line 3 to the desired rate.

The sterilizing agent in tank 7 is maintained at a pressure of at least 5 p.s.i., and preferably in the range of 25 to 35 p.s.i., above the pressure of the beverage in line 1. The pressure is applied to the sterilizing agent by an inert gas, such as nitrogen, which is introduced into the headspace of the tank 7 through a line 9. The pressure of the nitrogen or other gas is regulated by a conventional pressure regulating valve 10 which is connected in the line 9. The valve 10 serves to sense the pressure in the headspace and regulate the flow in line 9 so that the pressure of the gas on the sterilizing agent will remain relatively constant at all times. The portion of line 3 located immediately beneath tank 7 is enlarged to define a reservoir 11 and a conventional photo-electric cell 12 is mounted in the wall of the reservoir and senses the presence of liquid in the reservoir. Cell 12 is connected through an electrical circuit to an alarm, such as a light or horn, and, in addition, the cell 12 is connected in a second electrical circuit with the filling machine. When the liquid level in reservoir 11 falls beneath the level of photo cell 12, the first circuit is closed to sound the alarm and the second circuit is opened to stop operation of the filling machine. This insures that there will be no flow of inadequately sterilized material to the filling machine.

Located within the line 3 is a flow rate measuring unit 13 which measures the flow of the sterilizing agent through the line 3 and generates an output signal in proportion to the flow rate. The sterilizing agent is added to the perishable material in very minute quantities, generally in the range of 0.0001 to 2 grams/liter so that under production conditions the flow of the sterilizing agent through line 4 will generally be in the range of 1 to 40 ml. per minute. As the flow rate of the sterilizing agent is exceedingly low, a measuring unit must be employed which is capable of accurately measuring these low flow rates. As shown in FIG. 1, a pressure differential type of unit is employed in which the sterilizing agent in line 3 is passed through an orifice or restricted opening and the pressure is measured on either side of the orifice in line 3. The pressure differential is utilized as an indication of the flow rate of the sterilizing agent within line 3.

As an alternative, a thermal conductivity type of flow indicator can be substituted for the pressure differential type shown in FIG. 1, in which the flow of the sterilizing agent is directed into both a dead end passage, as well as into a through passage, and a heating element and thermistor are located within each passage. As the liquid within the dead end passage is under static conditions, the difference in temperature in the two passages serves as an indication of the flow rate of the liquid within the through passage.

Located in line 3 between the valve 8 and the injection unit 4 is a check valve 14 which permits flow of the sterilizing agent in a direction toward the inpection unit 4 but prevents flow in the opposite direction.

The injection unit 4 includes a generally T-shaped housing 15 and an L-shaped conduit 16 is connected to line 3 and extends within the housing. The outer section of conduit 16 is aligned axially with line 1, and a resilient head 17, fromed of rubber or a rubber-like material, is attached to the outer end of the conduit 16. Head 17 is provided with an internal flange 18 which is received within an annular groove in conduit 16, and the head is clamped to the conduit by a band 19. The sterilizing material is discharged from conduit 16 into the chamber defined by head 17 and then passes through slit 20 in the head to the line 1.

As the sterilizing material in line 3 is under a pressure greater than the pressure of the material in line 1, the pressure differential will open or expand the slit 20 and permit the sterilizing material to enter the flow stream of the perishable material in line 1. However, the slit 20 provides a positive shut-off in the event of a malfunction, and prevents the perishable material from line 1 from entering the conduit 16 and line 3.

The flow measuring unit 13 generates an output signal proportionate to the flow of sterilizing material in line 3 and this signal is fed to a totalizer unit 21 that serves to provide a continuous cumulative total of the volume of flow of sterilizing agent flowing within the line 3.

The output signal from the unit 13 is also transmitted to a conventional pen-type recorder 22 to provide a continuous reading of the flow of the sterilizing agent in line 3 and, in addition, the output signal from unit 13 is transmitted to a multiplier-divider unit 23.

Flow meter 2, which measures the flow of perishable material in line 1, also generates an output signal which is fed to a signal converter unit 24 having a reading scale which provides a visual indication of the flow of perishable material in line 1. The output signal from flow meter 2 is also fed to a totalizer unit 25 which provides a cumulative total of the volume of perishable material flowing in line 1.

The output signal from the signal converter unit 24 is fed to the recording unit 22 and to the multiplier-divider unit 23. The multiplier-divider unit 23 serves to divide the flow rate of sterilizing agent by the flow rate of the perishable material to thereby calculate, in parts per million, the actual proportion of concentration of sterilizing agent being introduced into the perishable material in flow line 1.

The output signal from the multiplier-divider unit 23 is fed to the controller unit 26 which compares the actual proportional flow with the preset proportional flow and acts to generate an "error" or feedback signal proportional to the difference between the actual and preset values. The error signal of controller 26 is fed back to the valve 9 to correspondingly adjust the valve 9 to provide the desired rate of flow of the sterilizing agent through line 3 to the injector unit 4.

In addition, the signal from the controller 26 is also fed to the recorder 22 to provide a continuous visual indication of the proportional flow or concentration, in p.p.m., of the sterilizing agent in the perishable liquid. The signal from the controller 26 is also fed to an alarm meter 27, and the alarm meter is provided with both minimum limits of concentration and maximum limits of concentration which straddle the concentration setting. If the actual concentration of the sterilizing agent or additive in p.p.m. falls outside of the minimum limits, meaning that the concentration is either above or below the minimum limits, an alarm is given which will indicate to the operator that the concentration of the additive is outside of the minimum limits. As a further safety precaution, if the concentration of the additive falls outside of the maximum limits, a switch connected in the electric circuit with the filling machine will be opened to stop the operation of the machine, and a signal will also be transmitted to the valve 9 to close the valve and prevent flow of the additive or sterilizing agent in line 3. This insures that there will be no flow of either the perishable material or the additive if the concentration of the additive is outside of the maximum set limits.

The present invention provides an effective method of continuously dissolving small amounts of a sparingly soluble material in a flow stream of a liquid. The additive is automatically introduced into the flow line and the addition is controlled within precise limits of concentration by a feedback system.

While the above description is directed to the addition of a sterilizing agent to a perishable material, such as for example, a beverage containing carbohydrates and/or proteins and subject to fermentation through enzymatic decomposition, it is contemplated that the process can be utilized to add any sparingly soluble additive to a liquid flow stream in a continuous process.

Various modes of carrying out the invention are contemplated as being within the scope of the following claims, particularly pointing out and distinctly claiming the subject matter which is regarded as the invention.

I claim:

1. An apparatus for blending small amounts of an additive into a liquid flow stream, comprising first conduit means, means for continuously flowing a stream of liquid through said first conduit means, injector means for introducing an additive which is relatively insoluble in said liquid into said flow stream, second conduit means for continuously supplying said additive to said injector means, valve means in said second conduit means, first signal generating means for measuring the flow rate of said liquid in said first conduit means and generating a first output signal in proportion to said flow rate, second signal generating means for measuring the flow rate of said additive in said second conduit means and generating a second output signal in proportion to the flow rate of said additive, means for comparing said first output signal with said second output signal and generating a third output signal proportional to the actual proportionate flow rate of said additive with respect to the liquid, and means for comparing said actual proportional flow rate with a preset proportional flow rate and generating a fourth signal in proportion to the difference between said actual proportional flow rate and said preset proportional flow rate, and means for feeding said fourth signal to said valve means to thereby control the flow of additive in said second conduit means to obtain a substantially uniform concentration of said additive in said liquid flow stream.

2. The structure of claim 1, and including agitating means located in said first conduit means for continuously agitating the stream of liquid to dissolve said additive therein.

3. The apparatus of claim 1, and including means for applying pressure on said additive in said second conduit means at least 5 p.s.i. greater than the pressure on said liquid within said first conduit means.

4. A method of blending small amounts of a sterilizing agent into a flow stream of a perishable liquid comprising the steps of continuously flowing a stream of the perishable liquid through a closed flow path, subjecting a static body of a liquid sterilizing agent to the pressure of an inert gas, said pressure being at least 5 p.s.i. above the pressure of said perishable liquid, continuously withdrawing sterilizing agent from said body and conducting said sterilizing agent to said flow stream, atomizing said sterilizing agent in said flow stream of the perishable liquid, and mechanically agitating the stream after the introduction of said sterilizing agent to thereby dissolve said sterilizing agent in said perishable liquid.

5. The method of claim 4, wherein said perishable liquid includes a water phase, said sterilizing agent being less than 1% soluble in said water phase at 20° C.

6. An apparatus for blending small amounts of a sterilizing agent into a perishable liquid material, comprising first conduit means to conduct a stream of perishable material, injector means located in said first conduit means for injecting a sterilizing agent into the stream of said perishable material, a storage tank to contain a liquid sterilizing agent at pressure in excess of the pressure of the liquid in said first conduit means, second conduit means connecting the storage tank to the injector means for supplying said sterilizing agent to said injector means, said injector means including a discharge head, said sterilizing agent being discharged from said head into the stream of said perishable liquid in the form of a mist, and means associated with the head for preventing flow of the liquid into said head.

7. The apparatus of claim 6, wherein the pressure in said storage tank is effected in part by an inert gas, and means for maintaining a substantially uniform pressure on said inert gas as the sterilizing agent is withdrawn from the tank.

8. The apparatus of claim 6, and including check valve means located in said second conduit means between the discharge head and the storage tank and separate from said last named means for permitting flow of said sterilizing agent in a direction from said storage tank to said injector means and for preventing flow in the opposite direction.

References Cited

UNITED STATES PATENTS

| | | |
|---|---|---|
| 2,717,874 | 9/1955 | Verain. |
| 2,774,578 | 12/1956 | Spiess et al. _____ 259—25 |
| 2,824,014 | 2/1958 | Sperti _____ 99—155 XR |
| 2,910,400 | 10/1959 | Bernhard et al. ____ 99—155 XR |
| 3,097,996 | 7/1963 | Thoma et al. ____ 99—155 XR |
| 3,236,655 | 2/1966 | Murch et al. _____ 99—155 XR |
| 1,849,945 | 3/1932 | Mobley et al. |
| 2,000,953 | 5/1935 | Hooker et al._____ 259—4 |
| 2,786,656 | 3/1957 | Corneil _____ 259—151 |
| 3,080,876 | 3/1963 | Adamson _____ 137—100 XR |
| 3,229,077 | 1/1966 | Gross _____ 137—101.19 XR |
| 3,297,305 | 1/1967 | Walden _____ 259—4 |
| 3,345,997 | 10/1967 | Miller et al. _____ 259—98 XR |

WALTER A. SCHEEL, Primary Examiner

J. M. BELL, Assistant Examiner

U.S. Cl. X.R.

99—252; 137—101.19; 259—19

UNITED STATES PATENT OFFICE
CERTIFICATE OF CORRECTION

Patent No. 3,506,460          Dated April 14, 1970

Inventor(s)     Peter D. Bayne

It is certified that error appears in the above-identified patent and that said Letters Patent are hereby corrected as shown below:

Column 1, line 29, cancel "present" and substitute therefor ---preset---. Column 2, line 14, cancel "contration" and substitute therefor ---concentration---. Column 2, line 57, cancel "4", second occurrence, and substitute therefor ---5--- Column 3, line 49, cancel "inpection" and substitute therefor ---injection---. Column 3, line 55, cancel "fromed" and substitute therefor ---formed---. Column 4, line 19, cancel "of" and substitute therefor ---or---.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents